United States Patent [19]

Dantoni

[11] 3,972,971

[45] Aug. 3, 1976

[54] METHOD OF MAKING ANIMAL LITTER

[76] Inventor: Joseph L. Dantoni, 2727 Old Washington Road, Westminster, Md. 21157

[22] Filed: Sept. 11, 1974

[21] Appl. No.: 504,870

[52] U.S. Cl. ............................. 264/115; 264/118; 264/141
[51] Int. Cl.² ........................................... B01J 2/20
[58] Field of Search .................... 264/118, 115, 141

[56] References Cited
UNITED STATES PATENTS 3,821,346   6/1974   Batley, Jr. ........................... 264/115

*Primary Examiner*—Robert F. White
*Assistant Examiner*—J. R. Hall
*Attorney, Agent, or Firm*—J. Wesley Everett

[57] ABSTRACT

A method of making animal litter consisting of grinding peanut hulls into a size that will allow the ground hulls to pass through a one-sixteenth to a one-half inch sieve. Mixing the ground hulls with a ground vegetable product such as alfalfa, broom grass, or a like product containing chlorophyl to give the mixture not less than one percent chlorophyl content. The mixture is subjected to a steam bath to moisten and soften the hulls and the added product which are then forced through a die to form the mixture into small pellets. The moisture in the pellets is reduced by heating as they pass through the die thereby removing at least eighty percent of the moisture.

2 Claims, No Drawings

METHOD OF MAKING ANIMAL LITTER

The present invention relates to a method of forming animal litter and particularly to a litter in which at least fifty percent of the litter is formed from discarded peanut hulls.

One object of the invention is to provide a method of forming animal litter from peanut hulls which at present is a waste product.

Another object of the invention is to provide a method of forming animal litter that is free from odor from animal secretions for a long period of time.

A further object of the invention is to provide a method of forming animal litter by using a product that has not been subjected to insecticides which cause reactions in animals, particularly when the animal is being used for scientific study.

A still further object of the invention is to provide a method of forming animal litter, a product that may be used for fertilizer after it has been previously used for a litter.

While several objects of the invention have been set forth, other objects and advantages will become apparent as the nature of the invention is more fully disclosed in the following description.

The animal litter is made primarily from discarded peanut hulls which at present are either burned or buried in the ground. The burning of the hulls releases a certain amount of fly ash and chemical gases into the air which has its effect on the environment. Also, when these hulls are buried, which amounts to thousands of tons, they do not work out too well as good land fills for the reason that they are too light, contain voids and decay slowly.

The hulls from the peanut hulling machine are ground to a substantially uniform size to pass through a one-sixteenth inch to a one-half inch sieve. The ground hulls are then mixed with not less than one percent chlorophyl, or with an added material which is a natural carrier of chlorophyl, such as alfalfa, broom grass, straw, etc., in the amount that would give the ground hulls substantially a one percent amount of chlorophyl.

These added products may first be mixed with the peanut hulls and both ground together, or the added materials may be ground separately and thoroughly mixed with the ground peanut hulls. The mixture is then heated by steam to soften and saturate the mixture with moisture at an advanced temperature changing the particles into a soft, pliable continuous state.

After the mixture has been heated by the steam it is forced through appropriate dies to pelletize the mixture into predetermined sizes. As the pelletized material passes through and from the die it becomes dry resulting in a relatively small, hard, heavy particle. The pelleted peanut hulls reduce their bulk by approximately one-third to one-sixth by weight making them a dry, highly absorbent, clean, compact substance with an increase in weight of three to six times the weight of the same volume of loose hulls.

Ground pelletized peanut hulls contain approximately only 8–11% moisture and are highly absorbent. The hulls absorb over three times their weight in water.

Some use of unground peanut hulls has been made for animal litter in the form in which they come from the huller. However, peanut hulls have not been very satisfactory for animal litter for the fact that they are dusty, light, and stick to the animal's hair and become very noisome within a very short time from the animal secretion.

The unground hulls lay very lightly and loosely together and allow the animal secretion to pass readily between the hull particles to the supporting surface.

When peanut hulls are ground and pelletized, the volume of hulls is reduced to one-third to one-sixth by weight of their original volume. The pellets lie more closely together and become a highly absorbing material, absorbing from two to three times more moisture than the same volume of conventional litter. The heat from the steam used to moisten the hulls and the heat generated in passing the material through the pelleting die plus the pressure used in compacting the hulls kills most organisms present making the resulting pellets clean and almost sterile.

The finished product is also a very desirable fertilizer as it is readily broken down by water, and when used for plant fertilizer the action of water will cause the pellets to readily fall apart and become a part of the soil. If the pellets are not used for fertilizer, they also are easily disintegrated by water and may be flushed into the sewer system.

While the above description sets forth a specific method of making animal litter primarily from discarded peanut hulls, it is not intended as a limitation as the scope of the invention is best defined in the appended claims.

I claim:

1. A method of making pelleted animal litter comprising:
  a. grinding peanut hulls to a particle size which will pass through a sieve of one-sixteenth to one-half inch;
  b. mixing said ground hulls with a chlorophyl-containing material in an amount to give the mixture a chlorophyl content of substantially one percent;
  c. heating said mixture with steam to soften and saturate said mixture with moisture into a pliable continuous state, and
  d. forcing said heated mixture through appropriate dies wherein said mixture in passing through and from said dies is thereby formed into dry pellets having a density of three to six times that of loose peanut hulls.

2. The method of claim 1 wherein the chlorophyl-containing material in step (b) is a natural carrier of chlorophyl selected from the group consisting of alfalfa, broom grass and straw.

* * * * *